March 1, 1955 W. J. KASER 2,703,059
METHOD AND MEANS FOR CONTINUOUS PRODUCTION OF PIE DOUGH
Filed Feb. 21, 1949 4 Sheets-Sheet 1

INVENTOR:
WILLIAM J. KASER
BY
ATT'YS

March 1, 1955 W. J. KASER 2,703,059
METHOD AND MEANS FOR CONTINUOUS PRODUCTION OF PIE DOUGH
Filed Feb. 21, 1949 4 Sheets-Sheet 2

INVENTOR:
WILLIAM J. KASER
BY
ATT'YS

March 1, 1955   W. J. KASER   2,703,059
METHOD AND MEANS FOR CONTINUOUS PRODUCTION OF PIE DOUGH
Filed Feb. 21, 1949   4 Sheets-Sheet 3
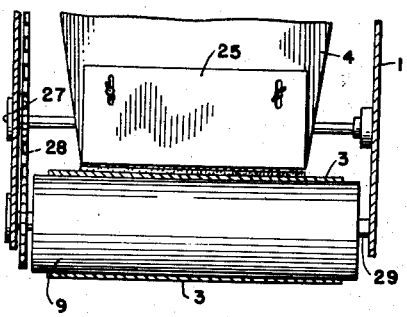
FIG. 4
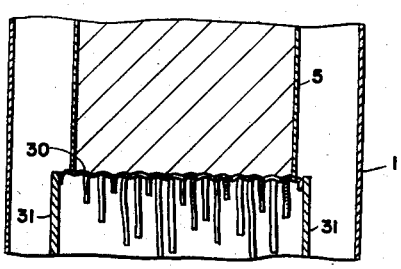
FIG. 5
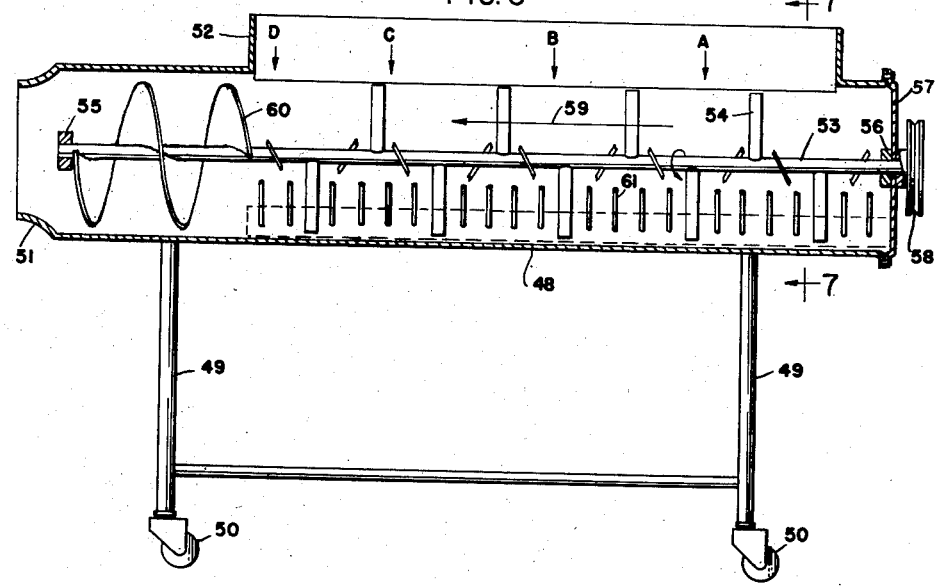
FIG. 6
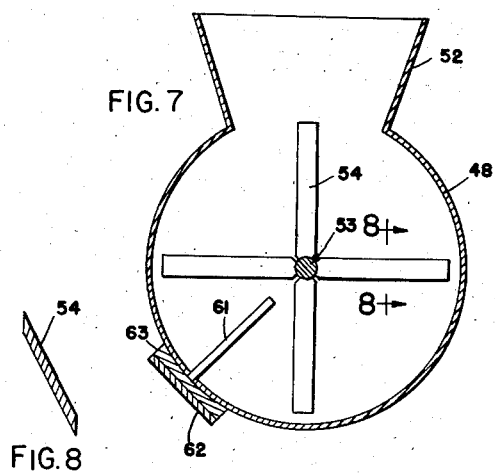
FIG. 7
FIG. 8
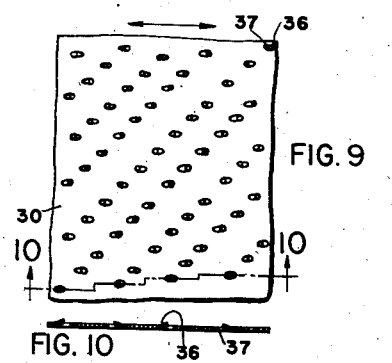
FIG. 9
FIG. 10
INVENTOR:
WILLIAM J. KASER
BY
ATT'YS March 1, 1955 W. J. KASER 2,703,059
METHOD AND MEANS FOR CONTINUOUS PRODUCTION OF PIE DOUGH
Filed Feb. 21, 1949 4 Sheets-Sheet 4

INVENTOR:
WILLIAM J. KASER
BY

ATT'YS

United States Patent Office 2,703,059
Patented Mar. 1, 1955

2,703,059

METHOD AND MEANS FOR CONTINUOUS PRODUCTION OF PIE DOUGH

William J. Kaser, Long Beach, Calif., assignor to Colborne Manufacturing Co., Chicago, Ill., a corporation of Illinois Application February 21, 1949, Serial No. 77,497

11 Claims. (Cl. 107—4)

This invention relates to the art of mixing dough for pie crusts and particularly to improvements in the method and means for mixing pie dough in commercial production quantities and in a continuous manner.

It is well known that in the making of pie dough it is essential that the ingredients be mixed with a minimum amount of handling or working and the problem has always been to cut or work the shortening into the flour, so as to obtain a uniform distribution of the shortening and flour, without so much manipulation of the mix as to cause the dough to become tough. Small batches mixed by hand can be controlled with sufficient skill and care. However, commercial batches are ordinarily too large for careful handling and the machinery involved requires overworking of the mix because of the quantities of material that are necessary for the volume desired.

The main objects of the present invention are to provide a mixing apparatus for pie dough which will thoroughly cut the shortening into the other ingredients with a minimum of working of the mix; to provide such a device in which the shortening is divided into pieces of relatively small section and then substantially uniformly mixed with the proper amount of flour prior to the cutting operation or final mix; to provide an improved means for mechanically dividing shortening into pieces of small section and embedding the pieces in flour automatically so that the individual pieces cannot mass together and lump during the cutting operation; to provide a continuous delivery pie dough mixing apparatus in which the period of the cutting operation may be readily changed without altering the delivery rate; to provide an improved automatic pie dough mixing apparatus in which the character of the dough can be easily altered or regulated to produce a baked crust that is either mealy, or has a short flake or long flake; to provide an improved method of mixing pie dough in commercial quantities; to provide an improved method of cutting shortening into a pie dough mix; to provide an improved method of varying the character of pie dough in the continuous production of the same for producing different types of baked crusts; and to provide an improved method of dividing commercial quantities of shortening and automatically coating the divided pieces with flour individually.

Two specific embodiments of this invention are shown in the accompanying drawings, in which:

Fig. 4 is a sectional detail of the coating and shredding device as taken on line 4—4 of Fig. 3.

Fig. 5 is a similar view of the same as taken on line 5—5 of Fig. 3.

Fig. 6 is a sectional view, in side elevation, showing the mixing and cutting portion of the apparatus shown in Fig. 1.

Fig. 7 is a sectional view of the same as taken on line 7—7 of Fig. 6.

Fig. 8 is a sectional view as on line 8—8 of Fig. 7, showing a cutting and mixing blade.

Fig. 9 is a fragmentary detail, in plan, showing the arrangement of the cutters on the shortening shredder.

Fig. 10 is a fragmentary sectional view of the same as on line 10—10 of Fig. 9.

Figure 1:
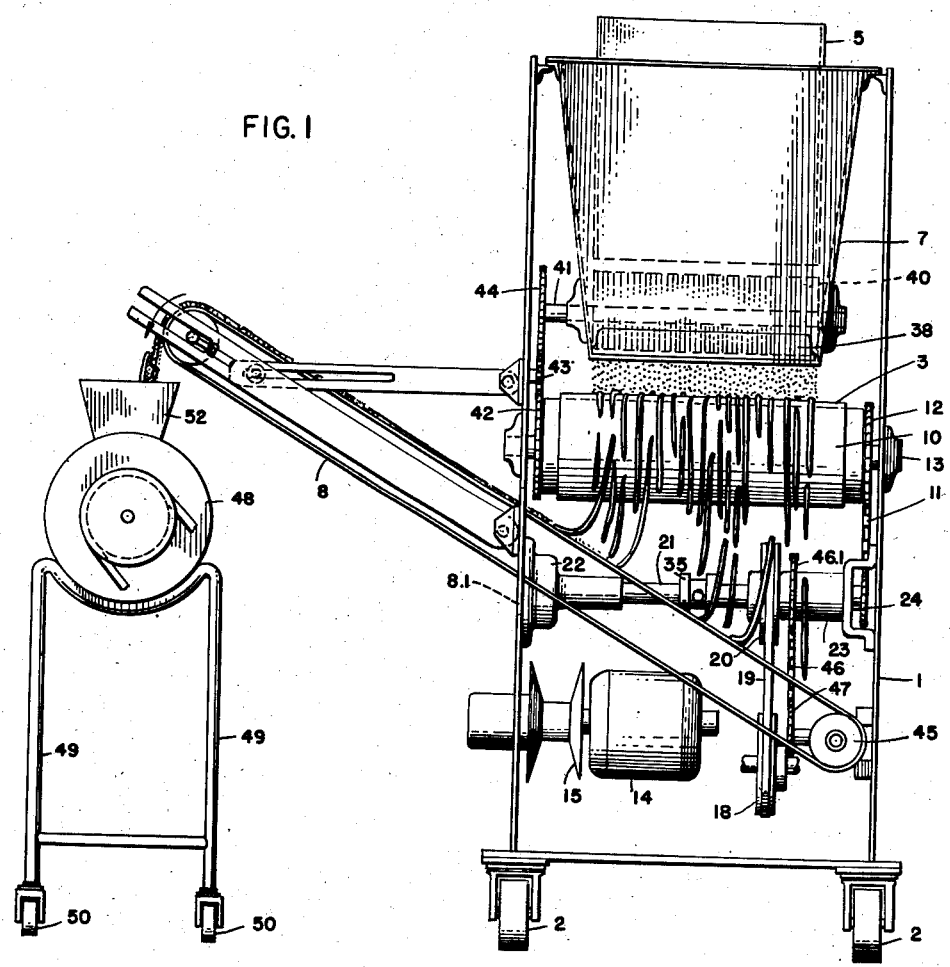
Figure 1 is an end view, in elevation, of the improved pie dough mixing apparatus embodying a unitary shortening shredding and flour coating device.
Figure 2:
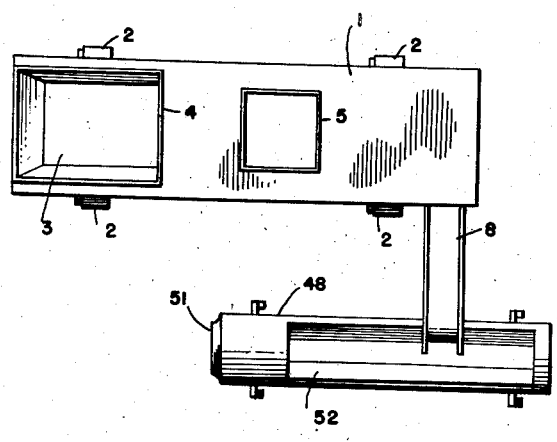
Fig. 2 is a plan view of the same showing the relationship of the two main elements of the combined apparatus.

In the form illustrated in Figs. 1 to 9 inclusive the improved dough mixing apparatus comprises a flour proportioning and shortening shredding device and a cutting and mixing device arranged as separate cooperating units disposed side by side whereby the divided shortening is first embedded in flour, furnished at a predetermined rate proportionate to the quantity of shortening, and then delivered to the mixer where the shortening and flour are cut together, mixed with seasoning and water and then delivered to a suitable dough trough for conveyance to a chill room or further processing.

As shown the flour proportioner and shortening shredder is a rectangular box-like unit 1, mounted on suitable wheels or casters 2, and having a horizontally disposed endless belt or conveyor 3 extending substantially from end to end of the device. At the rear end of this structure, a flour bin 4 is provided, above the conveyor belt 3, and arranged to deposit a sheet or layer of flour of predetermined thickness upon the top surface of the upper conveyor belt pass. Forwardly of the bin 4, and about in the center of the structure, is the shortening container 5 and an oscillating shredder 6 arranged to deposit divided pieces of shortening, preferably in the form of individual strips or strings, upon the layer of flour carried by the belt 3. Next in line is a flour dusting device 7, arranged to spread a thin coating of flour on top of the shredded or divided shortening; and finally at the forward end of the conveyor 3 there is a transfer belt 8 provided to deliver the shortening and flour to the mixer, the belt 8 being disposed transversely of the belt 3 and below the top surface thereof.

The primary conveyor 3 extends between and travels over a pair of horizontally journaled rollers 9 and 10, suitably mounted in the side frames of the box-like structure of the unit 1, and is driven continuously by means of a chain 11 and a sprocket 12 attached to one end of the shaft 13 which supports the roller 10. Power for the chain 11 is supplied by a motor 14 which, through a variable pitch pulley 15 and a belt 16, drives a speed reducer 17 which in turn drives a pulley 18 connected by a belt 19 with a pulley 20 secured fast on a cross shaft 21 mounted and journaled in suitable bearings 22 and 23 on the unit side frames. The shaft 21 carries a sprocket 24 at one end and this last sprocket is meshed with the chain 11 for driving the roller sprocket 12.

The flour bin 4 is open at its bottom end so that the flour contents rest upon the belt 3, suitable side rails, not shown, being provided to prevent flour spilling outwardly from the sides of the bin, and a vertically adjustable gate 25 is provided at the forward side of the bin to regulate or control the thickness of the flour layer or sheet that is picked up by the belt 3 as it passes beneath the bin. Also, to prevent packing of the flour in the bin and at the delivery gate 25, a pair of agitator rollers 26 and 27 are mounted in the interior of the bin 4 on horizontal axes. Each of these agitators is provided with a plurality of radially projecting pins or fingers which stir the flour and, as shown, one agitator is disposed at about the center of the bin and the other is located next to the gate. The shafts of the agitators extend through one side of the bin and carry suitable pulleys or sprockets which are driven by means of a belt or chain 28 which in turn is driven from the shaft 29 of the rearward belt roller 9 as shown in Fig. 1.

As shown in Fig. 1, the shortening shredder or divider comprises the container 5, which is open at its top and bottom ends and is proportioned to receive a standard or commercial size cake of shortening, and an oscillating shredder 30 disposed below the bottom end of the container 5. The shredder is an arcuate plate-like member, each point of which is equidistant radially from a horizontal axis of oscillation, and the device is supported by a pair of side members 31 which are pivoted on a cross shaft 32, coincident with the axis of oscillation. The drive for the shredder is by way of a connecting rod 33 having one end pivotedly attached between the side members 31, as at 34, and having its other end journaled on a crank 35 formed in the cross shaft 21 at an appropriate location as indicated in Fig. 1.

As shown the cake of shortening rests directly upon the shredder surface, which moves back and forth across the bottom end of the container 5, and during such movement the shortening is automatically divided into strips or strings which drop from the underside of the shredder to fall and lay lengthwise of the belt 3 and become embedded in the layer of flour that has been provided by the flour depositor 4.

The construction of the shredder and the nature of the shredding, stripping or cutting elements, is illustrated in Figs. 9 and 10 and it will be seen that the principle employed is like that of the well known vegetable or cabbage shredder. Preferably, the shredder should operate on the cake of shortening during its stroke in each direction and the strips or strings of shortening stripped from the cake should lie close together. Also a large number of strings or strips should be formed during each stroke of the shredder.

For these reasons the entire surface of the shredder is provided with cutting elements and, as shown in Figs. 9 and 10, the cutting elements 36 are laid out or arranged in diagonally extending rows with the cutters in each row staggered transversely relative to the cutters in the preceding row. Also as shown the cutters in alternate rows face in opposite directions so that shredding will occur on the oscillating stroke of the device in either direction. As shown in Fig. 10 the cutting elements 36 are formed by first punching round holes 37 in the shredder plate and then pressing or otherwise forming the trailing side of the hole margin so that its edge projects outwardly from the surface of the plate on the side of the plate which bears against the shortening cake. Thus a convex blade is formed, at the rear side of each hole, which projects above the shredder surface so as to slice a strip or string of shortening as the shredder is drawn across the surface of the cake.

With this arrangement of the shredder a sheet of shortening, made up of many individual strips or strings of shortening, is laid upon the sheet of flour on the belt 3 in such a way that each string of shortening is separately embedded in the flour and becomes individually surrounded by flour. Thus the shortening strips are prevented from sticking and massing together and substantially retain their individual identities.

After the shortening strips are laid upon the sheet of flour on the belt 3 the entire top surface is spread or dusted with a covering of flour to assure that the shortening strips are completely coated. This last operation is done by means of the dusting device 7 which comprises a hopper having a narrow throat at its bottom end and a slide gate 38 by which the throat opening 39 can be regulated. The throat opening extends transversely of the belt 3 and is partially blocked inside the hopper by means of a cylindrically shaped brush 40 mounted horizontally on a shaft 41 which is journaled in suitable bearings at the sides of the hopper. The brush 40 is rotated by means of the shaft 41 and, because of its proximity to the throat opening, causes the flour in the hopper 7 to be discharged slowly and at the same time spread evenly.

As shown, the shaft 41 is driven directly from the conveyor belt driving roller 10 by means of a gear 42 on the shaft 13 which, through an idler gear 43, drives a gear 44 on the brush shaft 41.

After the final dusting operation the mixture of flour and divided shortening is dropped off the end of the belt conveyor 3 onto the transversely extending conveyor belt 8 which transfers the material to the cutting and mixing section of the apparatus. As the flour and shortening drop to the belt 8 the material is turned and the shortening is further mixed with the flour. However, due to the individual coating of the shortening strings, the strings remain separate and do not become massed together in lumps. Thus the shortening is delivered to the cutter and mixer in relatively finely divided form and the final cutting operation can be performed with a minimum of working of the flour and shortening mass.

The conveyor 8 may be driven, through suitable drive connections, by means of the motor 14 which drives the other elements of the unit. As shown the inner roller 45 for the belt 8 is mounted on a shaft journaled in suitable bearings fastened to the unit side frame and this shaft is driven by a chain 46 leading from a sprocket 46.1 on the cross shaft 21 to a second sprocket 47 which is mounted on a stub shaft having a beveled gear connection, not shown, with the shaft of the roller 45. Thus all elements of the shredder unit are driven from a common power source and operate in unison.

The cutter and mixer comprises a tubular shell or chamber 48 disposed horizontally and mounted on a frame having supporting legs 49 which elevate the device a convenient distance above the floor. Preferably the legs 49 are provided with wheels or casters 50 so that the device may be readily shifted or moved relative to the shredder unit.

As shown, the shell 48 is of substantially uniform diameter throughout its length and is provided with a discharge nozzle 51 at one end through which the mixed dough is delivered into a suitable trough or truck, not shown. Also, the shell 48 is provided with a longitudinally extending hopper 52 on its top side, which hopper extends substantially three quarters of the length of the shell 48 and opens directly to the interior thereof, the arrangement being such that the flour and shortening material delivered from the end of the conveyor belt 8 may be dropped directly into the interior of the mixing chamber.

The cutting and mixing means comprises a shaft 53 which extends axially through the shell or chamber 48, and which carries a plurality of longitudinally spaced, radially projecting blades 54. The shaft 53 is journaled at its front end on a bearing 55 suitably mounted on a cross bar extending horizontally across the discharge end of the shell, and at the rear end the shaft is supported in a bearing 56 which is mounted on a removable end plate 57 which serves as an end closure for the shell 48. The shaft 53 extends through the end plate 57, and on its outer end carries a pulley 58 by means of which the shaft 53 is driven from a suitable power source not shown.

The cutting blades 54 are angularly spaced about the shaft in progressive 90 degree increments of angular direction, as shown in Fig. 7, and each blade is disposed on the shaft 53 so that its plane will be inclined relative to the axis of the shaft with its leading edge turned rearwardly so that the blade serves as a radial segment of a screw conveyor. Thus, the blades 54 serve not only to cut through the material that is delivered into the interior of the shell 48, but also serve to propel the material in the direction of the arrow 59 and toward the nozzle 51.

The blades 54 are disposed along substantially three-quarters of the length of the shaft 53 and the last quarter of the shaft length nearest the outlet 51, is provided with a solid wall screw conveyor blade 60, which serves as a positive means for forcing the dough outwardly from the mixer through the outlet.

In order to assure adequate cutting action of the blades 54 on the dough contained in the mixer, a plurality of radially disposed inwardly projecting fingers 61 are mounted in the wall of the shell 48, the fingers 61 being spaced axially of the shell so as to be located between the blades 54. Thus, the fingers 61 interrupt the angular travel of the dough through the mixer sufficiently to allow the blades 54 to cut through the dough, while at the same time propelling it toward the discharge nozzle 51.

As shown in Fig. 7, the fingers or pins 61 may be mounted on a plate 62, which is fastened by bolts, or any other suitable means, onto a pad 63 on the exterior of the shell 48, the pins 61 projecting through suitable apertures in the wall of the shell 48. This arrangement permits the pins or fingers 61 to be readily removed for cleaning purposes.

The purpose of the longitudinally extending hopper 52 is to permit the introduction of the flour and shortening materials at different locations along the axis of the cutter shaft 53, and to thereby vary the time period during which the material is subject to cutting and working action of the blades 54. It is well known that with a minimum of handling or working of the dough during the cutting operation, the baked pie crust formed from the dough will have a long flake and that as the working period is prolonged, the finished pie crust will have progressively shorter flake until finally it becomes what is known as a mealy texture. Thus, if the mixer and cutter are located so that the flour and shortening material is introduced at the station A, at the rear end of the mixer shell, a mealy texture in the baked pie crust will be produced. Also, if the flour and shortening material is introduced at the station B, toward the middle of the length of the mixer shell, a short flake will be produced; and if the flour and shortening material is introduced at station C toward the front end of the device, a long flake will be produced in the finished pie crust.

It will be understood, of course, that seasoning, such as salt, and any other ingredients necessary to the finished mix, will be introduced at the same point that the flour and shortening are delivered into the mixer, and that finally during the last stage of the cutting operation, the proper quantity of cold water will be introduced into the mix at the station D.

It will be seen that with this type and construction of the cutter and mixer, the working period of the dough can be accurately regulated and controlled, and can be readily varied to produce whatever type of finished pie crust may be desired. It will also be seen that, with the present construction, a thorough cutting action, to cut the shortening into the flour, may be obtained with a minimum of working of the dough, so that regardless of the type of the finished crust desired, toughness in the pie crust will be obviated.

Figure 11:
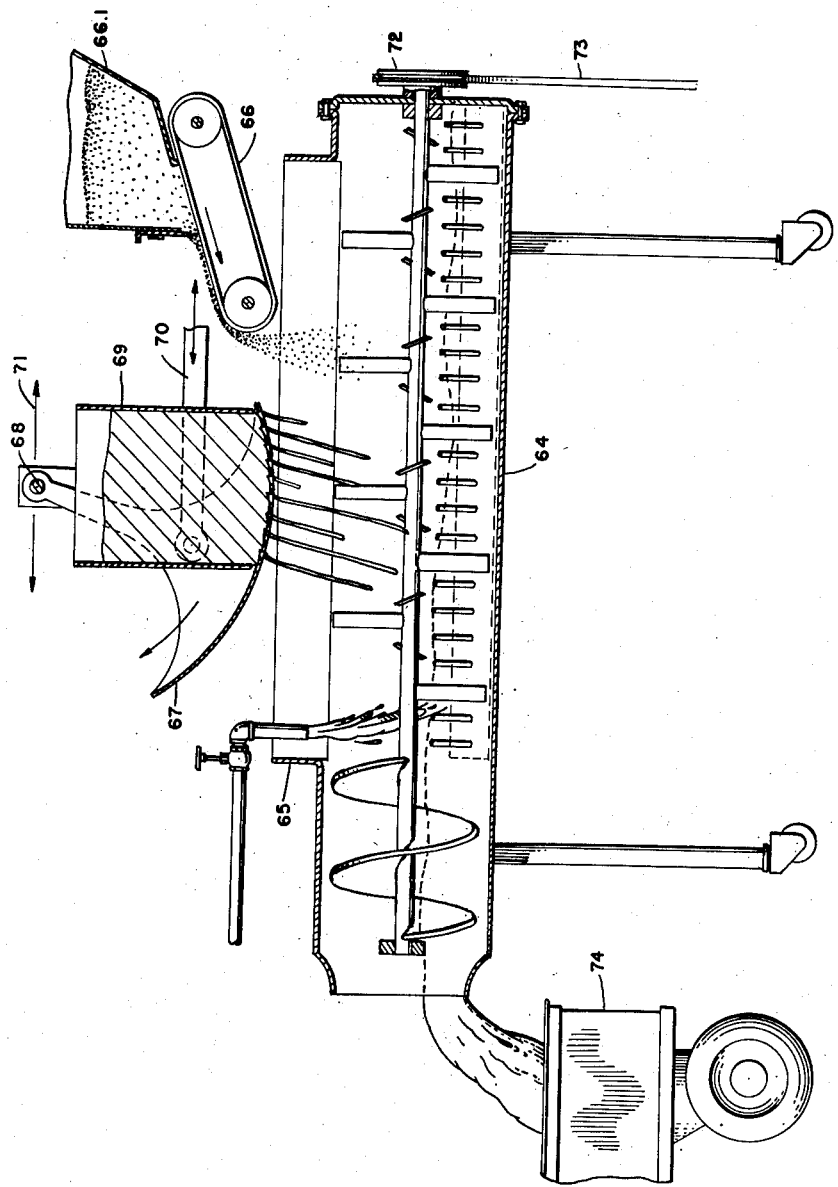
Fig. 11 is a side view, in sectional elevation, showing a modified form of the improved dough mixing apparatus as embodied in a single unitary structure.

In the modified form of the apparatus shown in Fig. 11, the shortening shredder and flour proportioning means are combined with the cutter and mixer as a single unit. The cutter and mixer, indicated generally by the number 64, is of the same construction as the device shown in Fig. 6 and heretofore described. However, as indicated schematically in Fig. 11, the flour delivery means and the shortening shredder are mounted on the unit directly above the hopper 65 and are arranged to be shiftable longitudinally of the mixer to vary the point or station at which the flour and shortening material is introduced to the cutting blades.

As shown in Fig. 11, the flour delivery means is indicated schematically by the conveyor belt 66 and the hopper 66.1, although it will be understood that any suitable means for introducing the flour in measured quantities may be employed. The shortening shredder 67 is indicated as an upwardly curved shredder plate mounted to oscillate about an axis 68, located above the container 69 which is designed to hold a standard size cake of the shortening material. The shredder 67 is constructed on the same principle as the shredder 30 shown in Figs. 3 and 9, the only difference being that the axis of oscillation is above the shortening container instead of below. The shredder 67 is arranged to be oscillated by means of a connecting rod 70 which, together with the conveyor 66, may be driven by any suitable means, not shown, and the entire shredder and flour delivery assembly is arranged to be shifted axially of the mixer, along the hopper 65, in either direction as indicated by the arrow 71.

In the operation of this combined form of the apparatus, the cutter shaft will be rotated by means of the pulley 72 at the rear end which will be connected to a suitable source of power by means of a belt 73. The flour will be delivered to the mixer in proper quantities by the belt 66 which with the shredder will be located at the desired point along the axis of the mixer shaft to provide the proper cutting period for the particular type of crust that is desired from the dough. It will thus be seen that with the apparatus as shown in Fig. 11, the finally divided strings or strips of shortening material will be introduced into the flour in the mixer, in such a way that the divided pieces of shortening will be quickly mixed and cut into the flour without lumping or bunching together, thereby producing a substantially uniform distribution of the shortening through the flour and throughout the mixed dough, that is delivered from the discharge end of the device into the dough trough or truck 74, with a minimum of working of the dough.

In the operation of the shredding unit shown in Figs. 1 to 5 inclusive, the layer of flour placed upon the conveyor by means of the flour hopper 4, will be of sufficient thickness to provide the proper quantity or proportion in relation to the amount of shortening supplied by the shredder 6 and the strings or strips of shortening that are dropped into this layer of flour will be about one-quarter inch thick, so that as the strings or strips of shortening fall into the layer of flour, they become substantially embedded therein. Thus, the amount of flour that is spread by the duster 7 is relatively small compared to that delivered from the hopper 4, as it is only necessary to dust on sufficient flour to assure that each shortening strip or string becomes thoroughly coated with flour. Also, if desired the seasoning and browning ingredients may be introduced with this dusting flour in which case the quantity of dusting flour will be accurately regulated.

Figure 3:
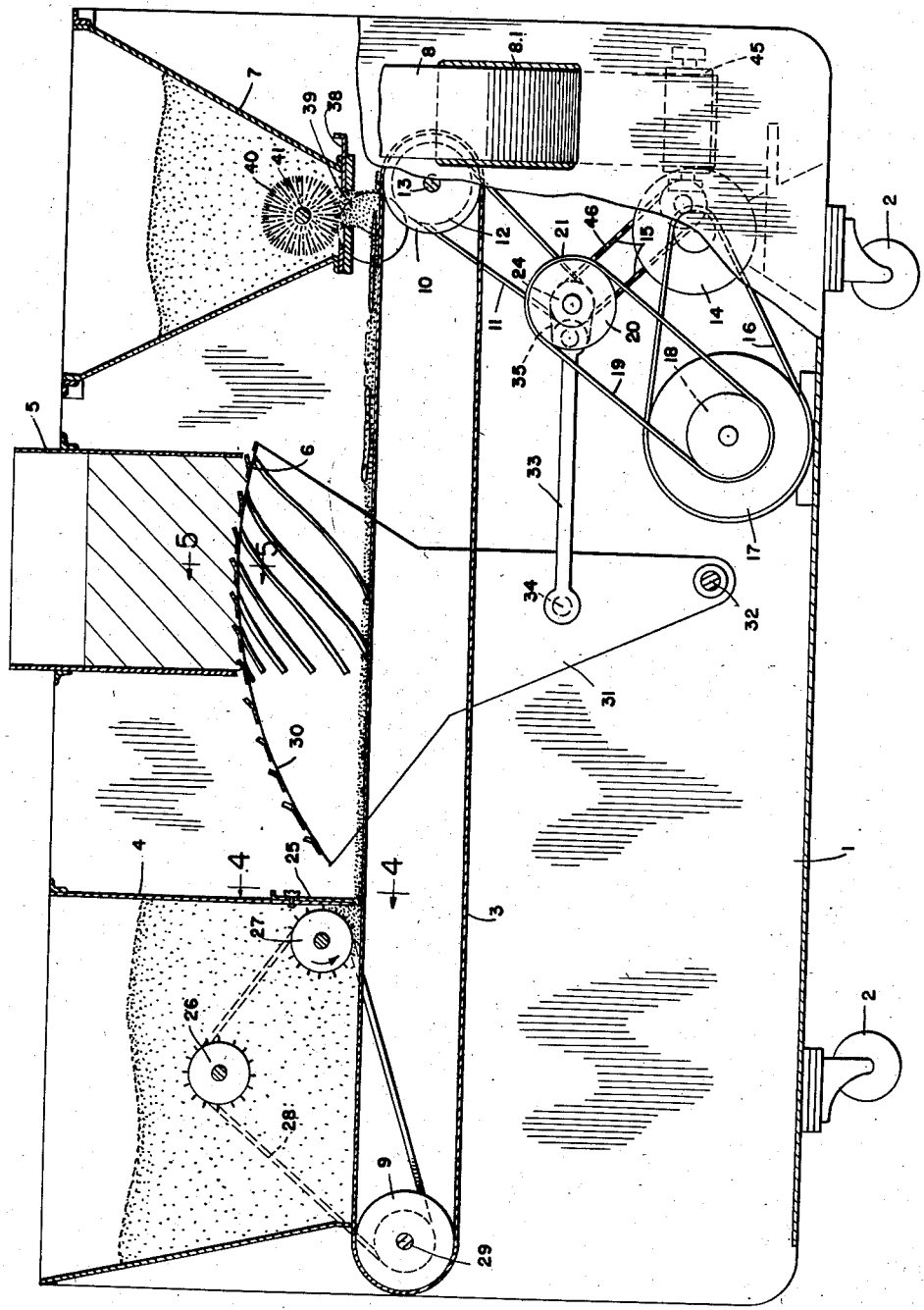
Fig. 3 is a sectional side view, in elevation, showing the internal arrangement of the shortening shredding and flour proportioning device of Fig. 1.

As indicated in Fig. 3, the various elements of the shredding and flour proportioning unit are wholly enclosed within the main box-like structure 1, and the conveyor 8, which delivers the flour and shortening materials from the shredder to the mixer, will project from the body of the shredder unit through a side opening 8.1.

The main advantages of the improved pie dough mixing apparatus reside in the arrangement whereby the shortening is first finely divided into separate relatively thin strings or strips and these strings are then mixed with the flour in such a manner that the shortening pieces tend to retain their individual identity and do not mass together in lumps, which would require a long and strenuous mixing and cutting period in order to assure uniform distribution of the shortening throughout the flour mass. Other advantages reside in the arrangement whereby the flour and shortening are delivered to the cutting blades in such a manner and form that the number of cutting strokes and the length of the cutting period, necessary for thorough mixture of the shortening and flour, is reduced to a minimum. And still further advantages are to be found in the arrangement of the apparatus whereby the length of the cutting and mixing period may be easily, quickly and accurately adjusted to vary the type of finished crust that will be produced by the mixed pie dough.

Although two specific embodiments of this invention are herein shown and described, it will be understood that details of the constructions shown may be altered or omitted without departing from the spirit of this invention as defined by the following claims.

I claim:

1. A pie dough preparing apparatus comprising means to form a plurality of pieces of shortening continuously, and to deposit the shortening pieces at a substantially uniform rate in a moving bed of dry flour, said pieces being of relatively small cross section, means to supply flour continuously for said bed of flour at a predetermined rate and in proportion to the quantity of shortening deposited by the first means, means to convey said bed of flour along a predetermined path, rotating cutter means having individual radial elements longitudinally spaced relative to said path and adapted to cut successively through said flour and shortening material as it progresses along said path, and means to vary the time period of the cutting action on said material for regulating the shortening particle size in the finished dough.

2. A pie dough preparing apparatus comprising means to form a plurality of pieces of shortening continuously, and to deposit the shortening pieces at a substantially uniform rate in a moving bed of flour, said pieces being of relatively small cross section, means to supply flour continuously for said bed of flour at a predetermined rate and in proportion to the quantity of shortening deposited by the first means, means to convey said bed of flour along a predetermined path, cutting means having cutter elements longitudinally spaced along said path and adapted to cut successively through said material as it progresses along said path, and means to vary the length of said path within the zone of said cutting means for regulating the shortening particle size in the finished dough.

3. A pie dough preparing apparatus comprising a moving conveyor, means to form a continuous layer of flour of predetermined thickness on said conveyor, means to deposit a plurality of individual pieces of shortening onto said layer of flour continuously as said conveyor progresses, means to spread a second layer of flour over said shortening pieces, and means to deliver the flour and shortening material continuously to a progressive cutting and mixing device.

4. A pie dough preparing apparatus comprising a horizontally disposed endless belt conveyor having spaced end rollers over and around which said belt continuously travels, flour depositing means at the rear end of said conveyor adapted to form a layer of flour of predetermined thickness on the top surface of said conveyor belt, a shortening depositor spaced forwardly from said flour depositing means and having a shredding means adapted to continuously cut pieces of shortening from a solid cake thereof at a predetermined rate and drop said pieces individually onto said layer of flour, a flour dusting means adjacent the forward end of said conveyor and adapted to spread a second layer of flour over said shortening pieces, and a second conveyor adapted to receive the flour and shortening material from the end of the first conveyor and to transfer said material into a mixing device.

5. A pie dough preparing apparatus comprising a horizontally disposed cylindrical chamber having a discharge opening at one end and an opening in its upper side wall extending longitudinally thereof, a rotatable shaft extending axially through said chamber and having a plurality of individual angularly and axially spaced radially extending cutter blades thereon, said blades being formed and disposed to propel material held in said chamber toward said discharge opening and to simultaneously cut through such material in planes normal to the axis of said shaft, means for delivering flour into said chamber at a predetermined rate through said side wall opening to form a bed of flour in said chamber, and means mounted on said chamber above said side wall opening adapted to hold a cake of shortening, said last-named means being disposed between said flour delivery means and said discharge opening and including a moving cutter adapted to sever a plurality of individual pieces of shortening from said cake continuously and drop said pieces through the side wall opening of said chamber and into the bed of flour contained therein.

6. A pie dough preparing apparatus comprising a horizontally disposed cylindrical chamber having a discharge opening at one end and a longitudinally extending opening in its upper side wall, a rotatable shaft extending axially through said chamber and having a plurality of individual angularly and axially spaced radially extending cutter blades thereon, said blades being formed and disposed to propel material held in said chamber toward said discharge opening continuously and simultaneously cut through such material in planes normal to the axis of said shaft as such material travels therealong, means for delivering flour into said chamber at a predetermined rate through said side wall opening to form a bed of flour in said chamber, and means mounted on said chamber above said side wall opening adapted to hold a cake of shortening, said last-named means including a moving cutter adapted to sever a plurality of individual pieces of shortening from said cake continuously and drop said pieces through the side wall opening of said chamber and into the bed of flour therein, and said last-named means being shiftable longitudinally of said chamber along said side wall opening and between the flour delivery means and said discharge opening.

7. A pie dough preparing device comprising means to deliver flour at a predetermined rate, a moving conveyor means adapted to receive and transport the flour, a shortening divider adapted to deposit pieces of shortening into the flour moving with said conveyor, said divider comprising a container adapted to hold a cake of shortening material and having an open end toward which the cake of shortening moves, a cutter disposed at said open end of said container and having a plurality of blades arranged to engage said cake of shortening and sever string-like pieces of shortening therefrom, and means to actuate said cutter as said conveyor moves and in timed relation with the speed thereof.

8. A pie dough preparing device comprising means to deliver flour at a predetermined rate, a moving conveyor means adapted to receive and transport the flour at a predetermined speed, a shortening divider adapted to deposit substantially parallel string-like pieces of shortening into the flour moving with said conveyor, said divider comprising a vertical container disposed above said conveyor and adapted to receive and hold a cake of shortening, said container having open top and bottom ends, a cutter plate extending across and closing the bottom end opening of said container, and means to oscillate said cutter plate laterally across said end opening in timed relation with the speed of said conveyor, said cutter plate having a plurality of apertures therein and a cutting blade at one side of each aperture facing the direction of movement of the plate.

9. A pie dough preparing apparatus comprising means for forming a moving bed of dry flour, means for forming a plurality of individual strings of shortening and depositing said strings directly into said moving bed of dry flour at such a rate as to provide a predetermined flour and shortening proportion, means to move said flour and shortening continuously along a predetermined path, a plurality of cutting members in and spaced successively along said path and adapted to pass through the dry flour and shortening material as the said material travels along a predetermined portion only of said path for subdividing said shortening strings and coating the divided pieces thereof with flour, and means to vary the length of the said path within the zone of said cutting members for regulating the time interval during which said cutting members will act on the said material.

10. The method of preparing pie dough which consists in forming a continuously moving layer of dry flour and conducting said layer along a predetermined path, depositing individual pieces of solid shortening material having a relatively small cross section separately and at a predetermined rate onto the moving layer of flour, covering said shortening pieces with a second layer of flour of predetermined depth to embed the individual shortening pieces as they travel with the first layer of flour, and then cutting the shortening pieces into the embedding flour with successive cutting strokes to subdivide said shortening pieces as the flour and shortening material travel along a predetermined portion of said path.

11. In the process of preparing pie dough the method steps which consist of dividing solid shortening material into individual elongated strips, embedding the shortening strips individually and at a predetermined rate into a continuously moving bed of dry flour, said strips extending longitudinally of the bed of flour in substantially parallel relation, and then subdividing the shortening strips into particles of substantially uniform size by successive transverse cutting strokes through said moving bed of flour and shortening material.

References Cited in the file of this patent

UNITED STATES PATENTS

| | | |
|---|---|---|
| 61,037 | Badger | Jan. 8, 1867 |
| 510,141 | Josephson | Dec. 5, 1893 |
| 617,866 | Somasco | Jan. 17, 1899 |
| 738,925 | Moore | Sept. 15, 1903 |
| 1,218,116 | Post | Mar. 6, 1917 |
| 1,247,153 | Roberts | Nov. 20, 1917 |
| 1,482,473 | Lord et al. | Feb. 5, 1924 |
| 1,500,061 | Dimm | July 1, 1924 |
| 1,700,510 | Oches | Jan. 29, 1929 |
| 1,790,347 | Hawkins | Jan. 27, 1931 |
| 2,218,320 | Wenger | Oct. 15, 1940 |
| 2,300,396 | Bookidis | Nov. 3, 1942 |
| 2,366,673 | Paley | Jan. 2, 1945 |
| 2,555,902 | Salo et al. | June 5, 1951 |

FOREIGN PATENTS

| | | |
|---|---|---|
| 26,384 | Great Britain | Dec. 5, 1908 |
| 96,938 | Austria | May 10, 1924 |